(12) United States Patent
Oike et al.

(10) Patent No.: US 8,746,061 B2
(45) Date of Patent: Jun. 10, 2014

(54) LIQUID LEVEL DETECTING APPARATUS

(75) Inventors: Toshio Oike, Shimada (JP); Kenichi Tanaka, Shimada (JP); Akio Katou, Shimada (JP)

(73) Assignee: Yazaki Corporation, Tokyo (JP)

( * ) Notice: Subject to any disclaimer, the term of this patent is extended or adjusted under 35 U.S.C. 154(b) by 84 days.

(21) Appl. No.: 13/256,747

(22) PCT Filed: Mar. 16, 2010

(86) PCT No.: PCT/JP2010/054463
§ 371 (c)(1),
(2), (4) Date: Sep. 15, 2011

(87) PCT Pub. No.: WO2010/107035
PCT Pub. Date: Sep. 23, 2010

(65) Prior Publication Data
US 2012/0000282 A1    Jan. 5, 2012

(30) Foreign Application Priority Data
Mar. 17, 2009  (JP) ................................ 2009-064364

(51) Int. Cl.
*G01F 23/32* (2006.01)
*G01F 23/00* (2006.01)

(52) U.S. Cl.
USPC .......................................... 73/317; 73/290 R

(58) Field of Classification Search
USPC .......... 73/290 R, 290 B, 318, 320, 305–322.5
See application file for complete search history.

(56) References Cited

U.S. PATENT DOCUMENTS

| 2003/0037612 A1 | 2/2003 | Nagakura et al. |
| 2004/0163466 A1* | 8/2004 | Tsuda ............................. 73/313 |
| 2005/0040930 A1* | 2/2005 | Dedert et al. ................. 338/160 |
| 2005/0066723 A1* | 3/2005 | Sims, Jr. ......................... 73/313 |
| 2007/0163341 A1 | 7/2007 | Nagakura et al. |
| 2009/0000376 A1 | 1/2009 | Kawaguchi et al. |

FOREIGN PATENT DOCUMENTS

| JP | 11-281394 A | 10/1999 |
| JP | 2000-46632 A | 2/2000 |
| JP | 2000-193512 A | 7/2000 |
| JP | 2006-058598 A | 3/2006 |
| JP | 2007-093472 A | 4/2007 |
| JP | 3901968 B2 | 4/2007 |
| JP | 2007-187633 A | 7/2007 |
| JP | 2009-008535 A | 1/2009 |

OTHER PUBLICATIONS

Communication from the Japanese Patent Office dated Nov. 27, 2012, in a counterpart application No. 2009-064364.

(Continued)

*Primary Examiner* — Daniel S Larkin
*Assistant Examiner* — Jamar Ray
(74) *Attorney, Agent, or Firm* — Sughrue Mion, PLLC

(57) ABSTRACT

The change in a contact over time is stabilized by lowering intense wear of the contact in the initial sliding stage and imparting stabilized wear characteristics from the initial sliding stage. The contacts (33, 34) of a sliding body (30) have flat tops which contact conductive segments (23) and come into surface contact with the top portions of the conductive segments (23) when the contacts slidingly contact onto the conductive segments (23).

7 Claims, 11 Drawing Sheets

(56) References Cited

OTHER PUBLICATIONS

Communication dated Sep. 4, 2012 issued by the Japanese Patent Office in counterpart Japanese Patent Application No. 2009-064364.

International Search Report for PCT/JP2010/054463 dated Jun. 22, 2010 [PCT/ISA/210].

Office Action dated Aug. 13, 2013 issued by the State Intellectual Property Office of People's Republic of China in counterpart Chinese Application No. 201080012488.

* cited by examiner

FIG. 10

| | | DIAMETER OF CONTACT [mm] | | | | | | | |
|---|---|---|---|---|---|---|---|---|---|
| | | 0.1 | 0.2 | 0.3 | 0.5 | 0.6 | 0.7 | 0.8 | 1 |
| CONTACTING AREA [mm²] | MIN | | | 0.003 | 0.056 | 0.072 | 0.087 | 0.139 | 0.221 |
| | MAX | 0.008 | 0.023 | 0.037 | 0.065 | 0.106 | 0.138 | 0.167 | 0.263 |
| | AVE | | | 0.020 | 0.060 | 0.089 | 0.112 | 0.153 | 0.242 |
| SURFACE PRESSURE [N/mm²] | MIN | | ▲93% 92.827 | 4.743 | 3.689 | 3.041 | 1.896 | 1.194 |
| | MAX | 33.613 | 11.653 | 7.217 | 4.081 | 2.495 | 1.918 | 1.583 | 1.003 |
| | AVE | | | 50.022 | 4.412 | 3.092 | 2.480 | 1.740 | 1.098 |

▲65.4%
▲93.8%

LIQUID LEVEL DETECTING APPARATUS

TECHNICAL FIELD

The present invention relates to a contact type liquid level detecting apparatus which measures a remaining amount of fuel by detecting the liquid level, and particularly to a liquid level detecting apparatus that realizes highly reliable liquid level detection.

BACKGROUND ART

Conventionally, it is known that in a liquid level detecting apparatus for detecting a liquid level of a fuel tank of an automobile, in order to detecting the liquid level, the liquid level is converted into a potential difference by making contacts provided at a sliding body slide on a resistance plate with the upward and downward movement of a float moving upward and downward in accordance with the liquid level (see, for example, Patent Document 1).

In a liquid level detecting apparatus, as shown in FIG. 12, an arm 120, which is attached to a float 121, is pivotally moved in accordance with a change of the level of the liquid surface S. Contacts 111 and 112, which are provided at a sliding body 110 that moves integrally with the arm 120, slidingly contact on conductor electrodes 150A and 150B of a resistance plate 130. The liquid level is detected by detecting a voltage value that changes accordingly. In particular, in a liquid level detecting apparatus 100, the resistance plate 130 is configured by an Ag/Pd-type conductor circuit portion, which is not illustrated in the figure, sintered on an aluminum substrate. The metal contacts 111 and 112 of the sliding body 110 contact with and slide on the resistance plate 130.

PRIOR ART DOCUMENTS

Patent Document

Patent Document 1 JP-A-2009-8535

SUMMARY OF THE INVENTION

Problems to be Solved by the Invention

In the liquid level detecting apparatus, because the materials that form the conductor circuit portion typically contains glass component other than Ag/Pd, wear of the contact proceeds rapidly especially due to friction with the conductor circuit portion. On the one hand, the contacts 111 and 112 contact with the conductor electrodes 150A and 150B at the side of the resistance plate 130 as the contacts 111 and 112 are pushed by contact springs 140A and 140B. In particular, in order to ensure smooth contacting and sliding operation, the parts of the contacts 111 and 112 that contact with the conductor electrodes 150A and 150B are typically formed to have an R-shaped cross-section. Therefore, the contacts 111 and 112 contact with the conductor electrodes 150A and 150B in a point-contact mode. Because surface force, which is a force applied to the contacts, is extremely large, the contacts are sharply worn. On the other hand, in the above-mentioned liquid level detecting apparatus, the wear of the contacts and the sliding portion also proceeds with their usage. As a result, the area of the contacting parts of the contacts 111 and 112 and the conductor electrodes 150A and 150B increases gradually. Thus, because the surface pressure decreases gradually, the wear is lowered eventually, and the wear operation reaches normal slowly.

In view of the above facts, it is desired to decrease the pressure applied to the contacts when the contacts start to slidingly contact onto the above-mentioned conductor electrodes for a while (initial sliding stage in which the contacts repeat the sliding 100,000 times), so as to lower the wear when the contacts slidingly contact onto the conductor electrodes.

The present invention is made in view of the above mentioned facts. An object of the invention is to provide a liquid level detecting apparatus that realizes highly reliable liquid level detection all the time, wherein the change of a contact over time is stabilized by lowering intense wear of the contact in the initial sliding stage and imparting stabilized wear characteristics from the initial stage of sliding.

Means for Solving the Problems

In order to achieve the above object, a liquid level detecting apparatus includes following features (1) to (6).
(1) There is provided a liquid level detecting apparatus, comprising
a resistance plate that has a plurality of conductive segments provided on an insulating substrate, and a resistor electrically connected with the plurality of conductive segments; and
a sliding body that has a contact which contacts with the plurality of conductive segments, and slides on the plurality of conductive segments in accordance with change of a level of a liquid surface,
wherein the contact of the sliding body has a flat top which contacts with the conductive segments and comes into surface contact with top portions of the plurality of conductive segments when the contact slides on the plurality of conductive segments.
(2) In the liquid level detecting apparatus according to the above mentioned (1), the plurality of conductive segments are provided on the insulating substrate at approximately equal intervals; and the top portion of the contact has such a shape that the contact comes into contact with no more than two neighboring conductive segments when the contact slides on the plurality of conductive segments.
(3) In the liquid level detecting apparatus according to the above mentioned (2), the top portion of the contact has round shape, and the diameter φ of the top portion satisfies 0.5<φ [mm]<0.6, when the width W of the conductive segment is 200 [μm], and the interval D of the neighboring conductive segments is 200 [μm].
(4) In the liquid level detecting apparatus according to the above mentioned (2), the top portion of the contact has round shape, and the diameter φ of the top portion in an initial sliding stage satisfies 0.5<φ [mm]<0.7, when the width W of the conductive segment is 200 [μm], and the interval D of neighboring conductive segments is 200 [μm].
(5) In the liquid level detecting apparatus according to any one of the above mentioned (1) to (4), top portions of the conductive segments of the resistance plate which come into contact with the contact have flat shape, and come into surface contact with the top portion of the contact when the contact slidingly contacts with the plurality of conductive segments.
(6) In the liquid level detecting apparatus according to the above mentioned (5), wherein in the initial sliding stage when the contact slides on the plurality of the conductive segments, the top portions of the conductive segments becomes flat shape due to wear with the sliding of the top portion of the contact.

According to the liquid level detecting apparatus of the above mentioned (1), intense wear of the contact in the initial sliding stage is lowered by making the top portion of the contact that contacts the conductive segments flat. Thus, stabilized wear characteristics is imparted from the initial stage of sliding and the change of a contact over time is stabilized. It is possible to realize highly reliable liquid level detection all the time.

According to the liquid level detecting apparatus of the above mentioned (2), since the top portion of the contact has such a size that the contact does not simultaneously contact three or more neighboring conductive segments, it is possible for the apparatus to maintain a high level of liquid level detecting precision.

According to the liquid level detecting apparatus of the above mentioned (3), since the force per unit area applied to the top portion of the contact decreases greatly, and the contact has such a size that the contact does not simultaneously contact three or more neighboring conductive segments, it is possible to maintain a high level of liquid level detecting precision.

According to the liquid level detecting apparatus of the above mentioned (4), in the initial sliding stage when the top portion of the conductive segments does not become flat, even if the diameter $\phi$ of the top portion of the contact is less than 0.7 [mm], it is possible that the top portion of the contact have such a size that the contact does not simultaneously contact three or more neighboring conductive segments.

According to the liquid level detecting apparatus of the above mentioned (5), the wear of both the contact and the conductive segments in the initial sliding stage can be greatly lowered by making both the top portion of the contact that contacts with the conductive segments and the top portion of the conductive segments that contact with the contact flat.

According to the liquid level detecting apparatus of the above mentioned (6), although the conductive segments are not specially processed, the top portions of the conductive segments becomes natural and flat by slidingly contacting onto the flat top portion of the contact in the initial sliding stage. As a result, without processing the part which should become the top portions of the conductive segments, the wear of both the contact and the conductive segments after the top portion of the conductive segments has become flat can be greatly lowered.

Effects of the Invention

In the liquid level detecting apparatus of the invention, intense wear of the contact in the initial sliding stage is lowered by making the top portion of the contact which contacts with the conductive segments flat. Thus, stabilized wear characteristics is imparted from the initial stage of sliding and the change of a contact over time is stabilized. It is possible to realize highly reliable liquid level detection all the time.

The present invention has been briefly described above. Details of the invention will become more apparent by reading the below-described embodiments of the invention with reference to the accompanying drawings.

BRIEF DESCRIPTION OF THE DRAWINGS

FIG. 10 is a table showing the result of inspecting contacting areas and surface pressures for various contact diameters by making use of the liquid level detecting apparatus of the invention.

EMBODIMENTS OF THE INVENTION

Figure 1:
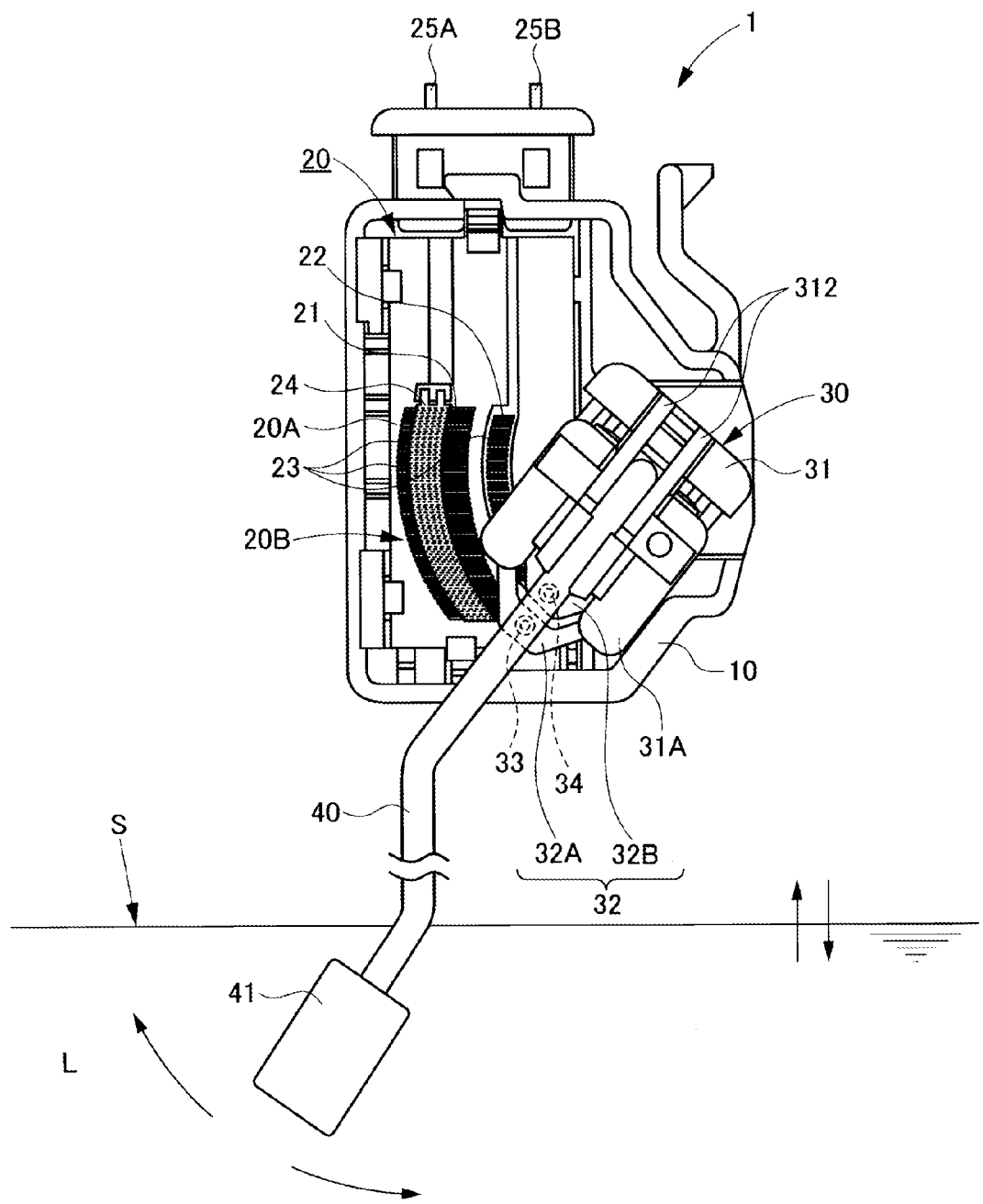
FIG. 1 is a plan view showing a liquid level detecting apparatus of an embodiment of the present invention.
Figure 2:
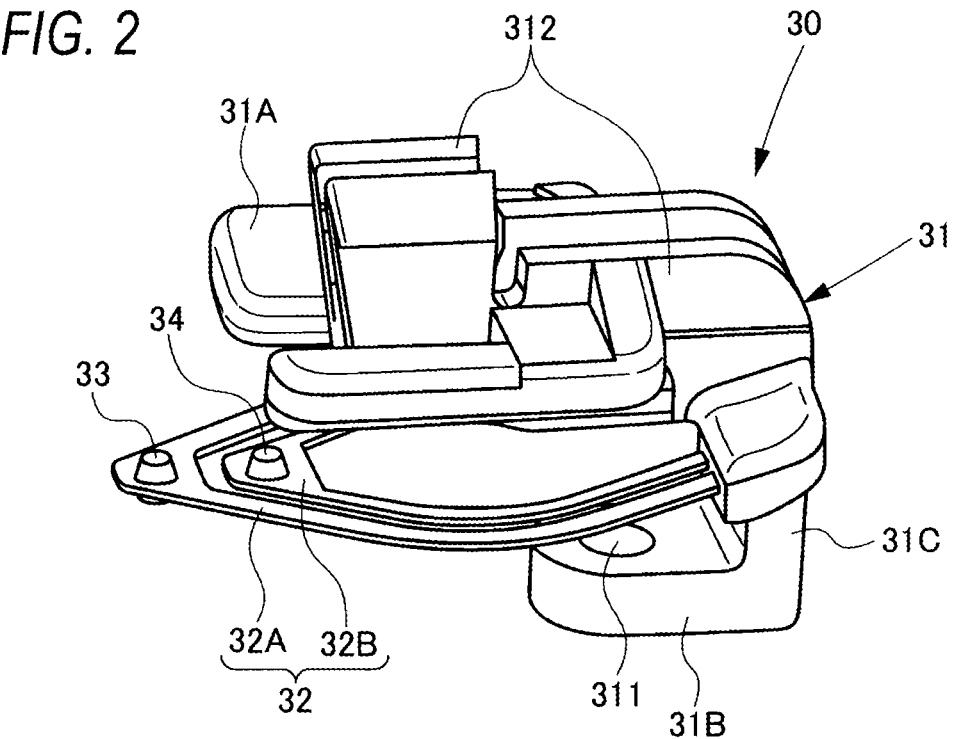
FIG. 2 is a perspective view showing a sliding body in FIG. 1.
Figure 3:
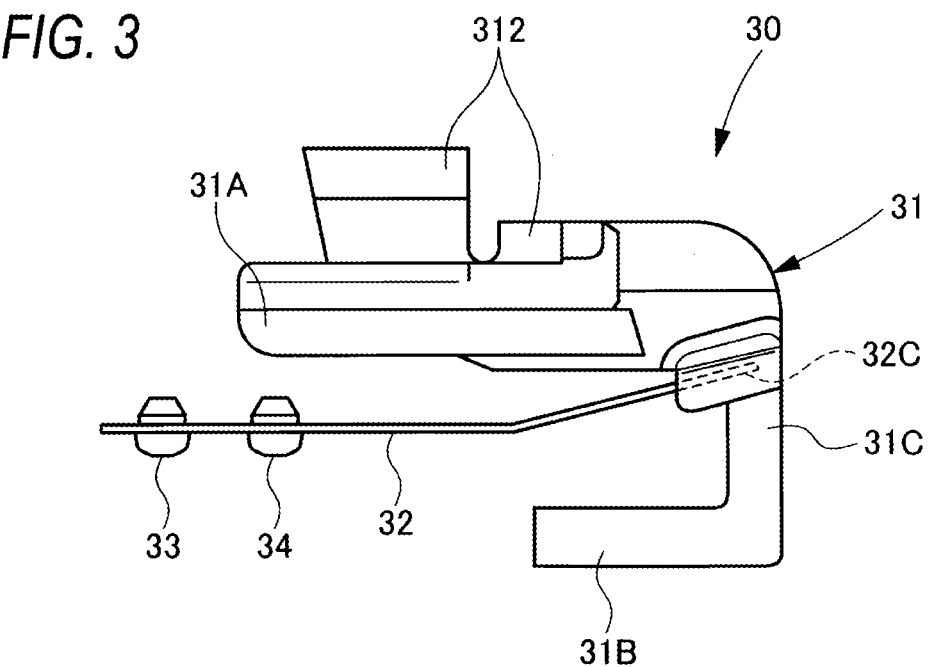
FIG. 3 is a side view of the sliding body.
Figure 5:
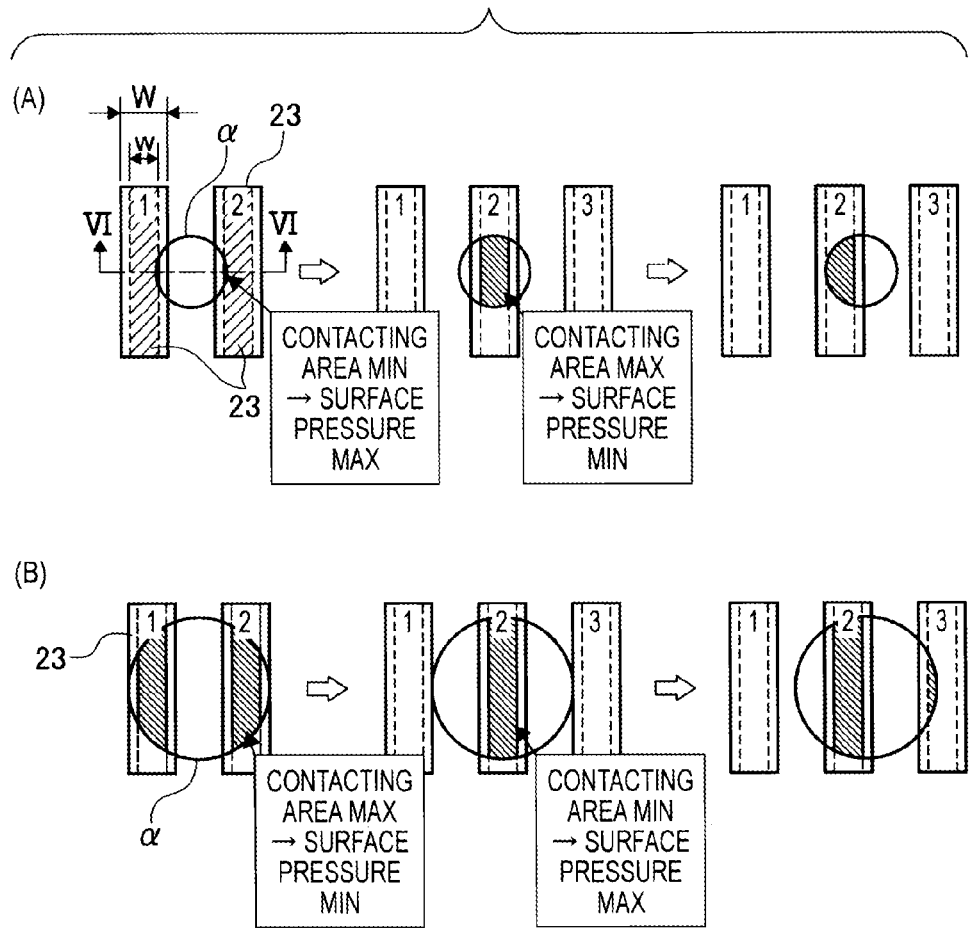
FIG. 5A is an explanatory diagram showing the relationship of the contact (diameter $\phi$ of the contact is 0.3 [mm]) of the invention and conductor pattern of the conductor segments.
FIG. 5B is an explanatory diagram showing the relationship of the contact (diameter $\phi$ of the contact is 0.6 [mm]) of the invention and conductor pattern of the conductor segments.
Figure 6:
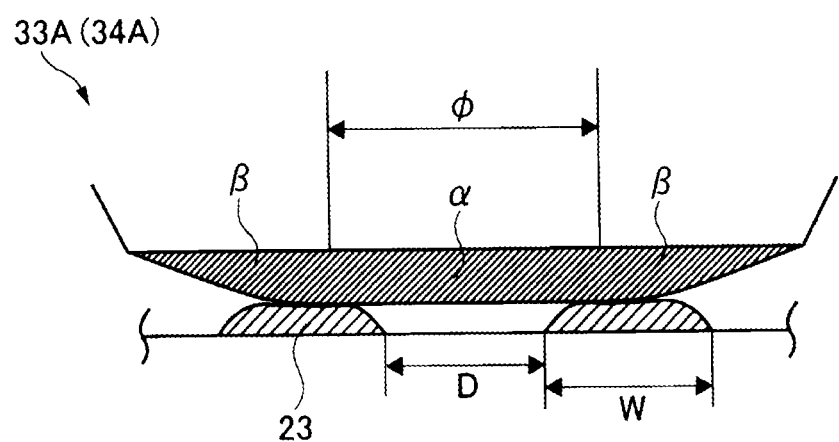
FIG. 6 is a VI-VI line section view of FIG. 5.
Figure 8:
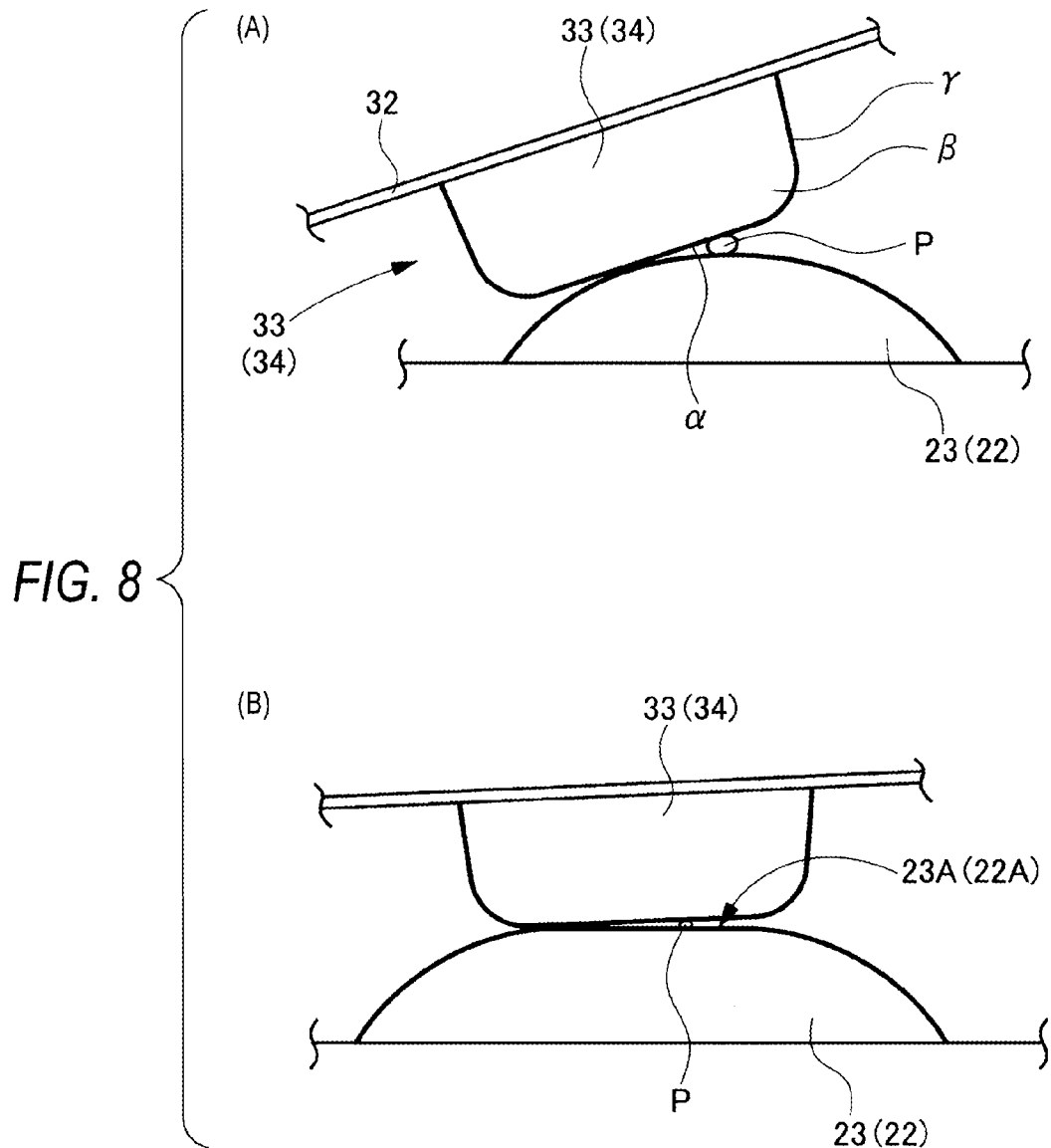
FIG. 8A is a side view for illustrating the contacting state of the conductor segment and the contact of the invention before the sliding starts and FIG. 8B is a side view for illustrating the contacting state of the conductor segment and the contact of the invention in the initial sliding stage.
Figure 9:
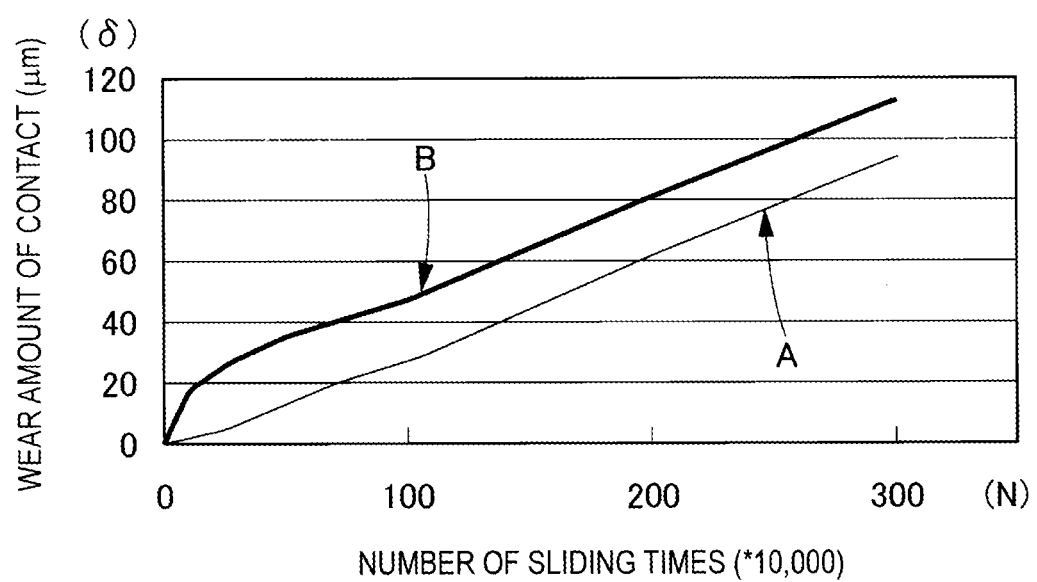
FIG. 9 is a chart of the relationship of the number of sliding times and the wear amount of the contact, which is obtained when comparison experiment are made by making use of the liquid level detecting apparatuses of the invention and a conventional one.
Figure 11:
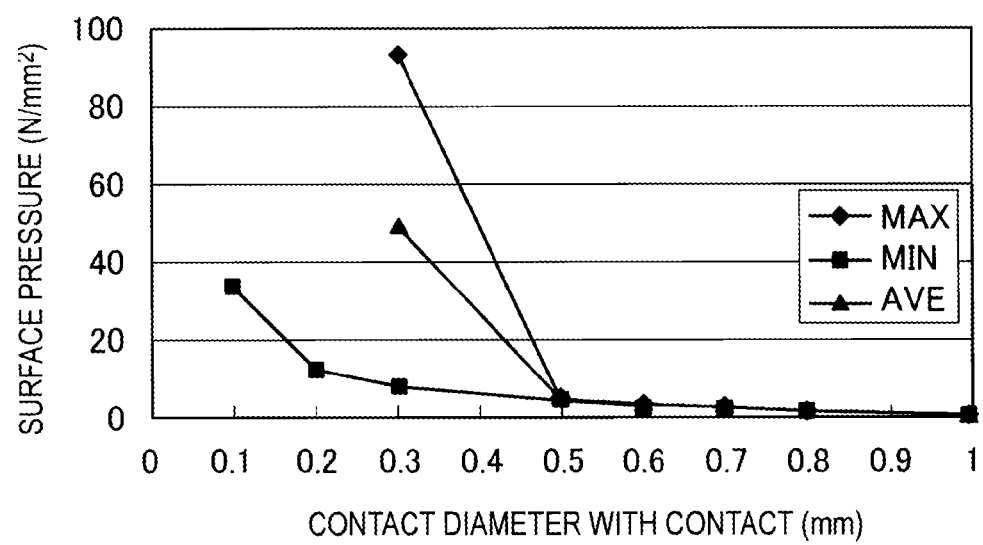
FIG. 11 is a chart showing the relationship of the various contact diameters and the surface pressures [N/mm$^2$] shown in FIG. 10.
Figure 12:
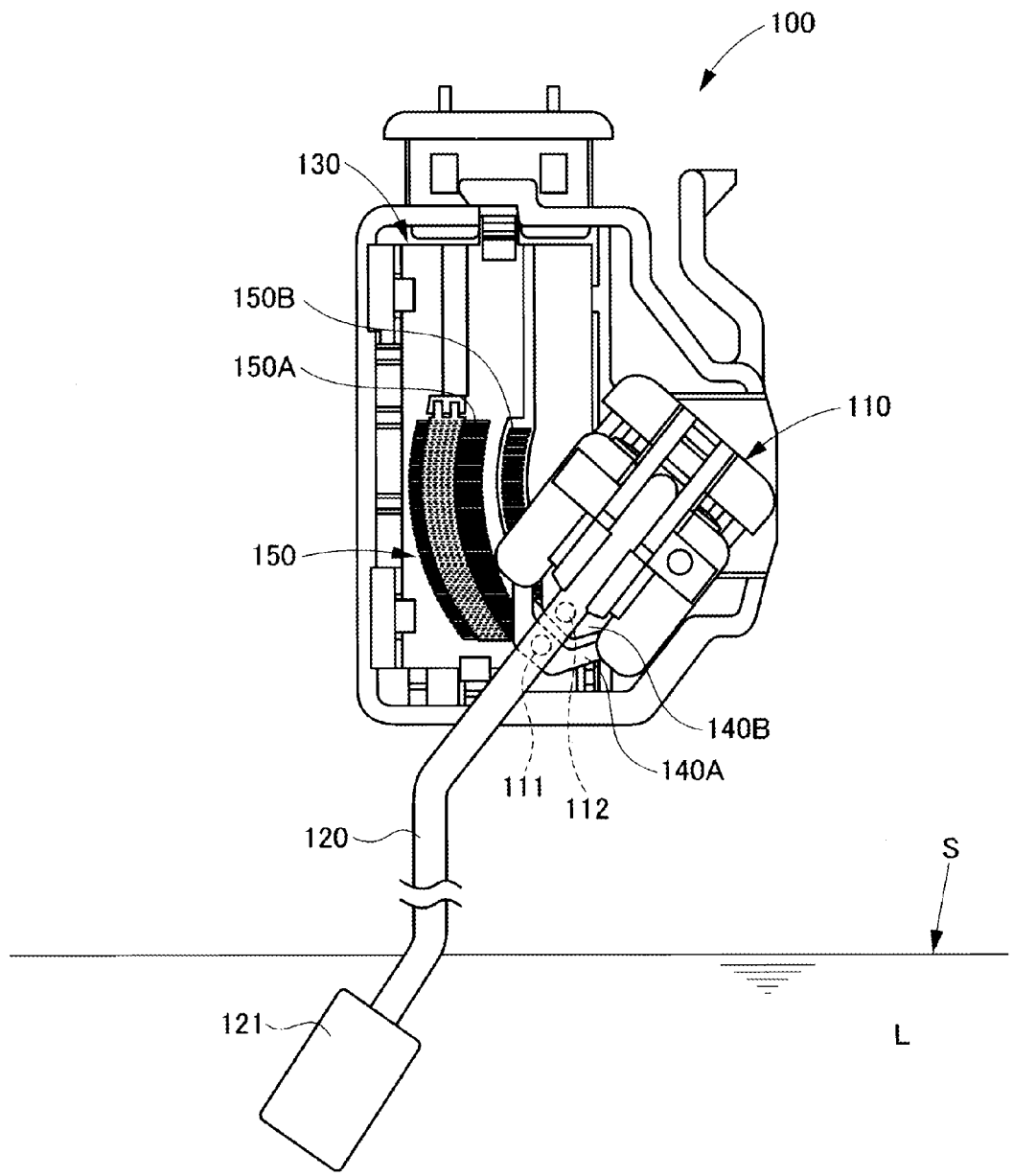
FIG. 12 is a plan view showing a conventional liquid level detecting apparatus.

Next, the embodiments of the invention will be described in detail with reference to the accompanying drawings. FIG. 1 is a plan view showing a liquid level detecting apparatus of an embodiment of the present invention. FIG. 2 is a perspective view showing a sliding body in FIG. 1. FIG. 3 is a side view of the sliding body. FIG. 4A is a side view showing a contact of the invention and FIG. 4B is a plan view of the contact. FIG. 5A is an explanatory diagram showing the relationship of the contact (diameter $\phi$ of the contact is 0.3 [mm]) of the invention and conductor pattern of the conductor segments, and FIG. 5B is an explanatory diagram showing the relationship of the contact (diameter $\phi$ of the contact is 0.6 [mm]) of the invention and conductor pattern of the conductor segments. FIG. 6 is a VI-VI line section view of FIG. 5. FIGS. 7A and 7B are side views for illustrating the shapes of the conductor segments which slidingly contact the contact before the sliding starts and in the initial sliding stage, respectively. FIGS. 8A and 8B are side views for illustrating the contacting state of the conductor segment and the contact of the invention before the sliding starts and in the initial sliding stage, respectively. FIG. 9 is a chart of the relationship of the number of sliding times and the wear amount of the contact, which is obtained when comparison experiment are made by making use of the liquid level detecting apparatuses of the invention and a conventional one. FIG. 10 is a table showing the result of inspecting contacting areas and surface pressures for various contact diameters by making use of the liquid level detecting apparatus of the invention. FIG. 11 is a chart showing the relationship of the various contact diameters and the surface pressures [N/mm$^2$] shown in FIG. 10.

FIG. 1 shows a liquid level detecting apparatus 1 according to the invention. The liquid level detecting apparatus 1 is mounted on an automobile in order to detect a height of a liquid surface S of liquid (fuel) L within a fuel tank outside the figure. The liquid level detecting apparatus 1 includes a frame 10, a resistance plate 20, a sliding body 30 and a float arm 40. A float 41, which moves upward and downward in accordance with a change of the level of the liquid surface S of liquid (fuel) L inside the fuel tank, is supported integrally at a distal end of the float arm 40.

The resistance plate 20 and the sliding body 30 are provided in the frame 10. The sliding body 30 slides on a conductive pattern 20B (described later) of the resistance plate 20 in conjunction with the rotation of the float arm 40.

The conductive pattern 20B, made of silver palladium (AgPd) which has excellent electrical conductivity and also is excellent in deterioration resistance and corrosion resistance, is provided on the resistance plate 20. The conductive pattern 20B includes an arc-shaped first sliding portion 21 and an arc-shaped second sliding portion 22 that are formed on an insulating substrate 20A.

In the first sliding portion 21, conductive segments 23, having roughly pectinate, are arranged at certain intervals in a sliding direction of the sliding body 30, and an arc-shaped resistor 24 is formed on the conductive segments 23. The resistor 24 is a resistance layer made of ruthenium oxide which is excellent in sulfur resistance and is less liable to be deteriorated and corroded by electrolysis even when it is exposed to an electrolyte such as ethanol and methanol. Adjacent conductive segments 23 are connected together via the resistor 24, a contact spring 32, a first contact 33 and a second contact 34 (the contact spring 32, the first contact 33 and the second contact 34 will be described later). The first sliding portion 21 is electrically connected to output terminal 25A.

In the second sliding portion 22, conductive segments 23, having roughly pectinate, are arranged at certain intervals in a sliding direction of the sliding body 30, and the arc-shaped second sliding portion 22 is formed by conductive materials (silver palladium). The second sliding portion 22 is electrically connected to 25B.

The sliding body 30 has, as shown in FIGS. 2 and 3, an arm holder 31, a contact spring 32, a first contact 33 and a second contact 34 that are fixed to one end of the contact spring 32.

The arm holder 31 is formed to be roughly U-shaped when viewed from the side (see FIGS. 2 and 3). An upper holding portion 31A and a lower holding portion 31B are formed to be parallel to each other, and are interconnected by an interconnecting portion 31C. The arm holder 31 of the embodiment is formed by injection molding synthetic resin.

A shaft hole 311 for the passage of the proximal end side of the float arm 40 therethrough is formed through the upper holding portion 31A and the lower holding portion 31B (See FIG. 2). Furthermore, the proximal end side of the float arm 40 is bent in a vertical direction orthogonal to the paper surface in FIG. 1, and the proximal end side is inserted through the shaft hole 311. Further, a pair of side walls 312 is set on the upper holding portion 31A, and the float arm 40 passing through the shaft hole 311 is held between the pair of side walls 312. Therefore, the arm holder 31 (the sliding body 30) is pivotally moved together with the float arm 40 in accordance with a change of the level of the liquid surface S. The float arm 40 of the embodiment is formed by bending a stainless steel wire into a predetermined shape.

The contact spring 32, as shown in FIG. 2, is formed by a thin sheet made of stainless steel having high corrosion resistance. A first contact holding portion 32A and a second contact holding portion 32B that are roughly V-shaped are formed to be parallel to each other. The first contact holding portion 32A and the second contact holding portion 32B are connected by a proximal end portion 32C (See FIG. 3) such that the first contact holding portion 32A and the second contact holding portion 32B are electrically connected together. The proximal end portion 32C is fixed to the upper holding portion 31A of the arm holder 31 by insertion molding.

The first contact 33 for sliding on the first sliding portion 21 is fixed to the distal end of the first contact holding portion 32A, and the second contact 34 for sliding on the second sliding portion 22 is fixed to the distal end of the second contact holding portion 32B. The first contact 33 and the second contact 34 are made of gold or gold alloy. Or the first contact 33 and the second contact 34 may be made of copper or copper alloy, in which case gold or gold alloy is plated on the surface of the copper or copper alloy substrate.

The first contact 33 and the second contact 34, as mentioned above, are fixed to the first contact holding portion 32A and the second contact holding portion 32B of the contact spring 32. In particular, the first contact 33 and the second contact 34 is fitted and fixed in holes (not shown in the figure) provided at distal ends of the first contact holding portion 32A and the second contact holding portion 32B. The first contact 33 and the second contact 34 have a specific shape shown in FIG. 4, respectively.

That is, the first contact 33 of the embodiment has a roughly inverted T-shape cross-section. Its lower part is a contacting portion 33A, its middle part is a fixing portion 33B for fixing to the contact spring 32, and its upper part is a conical portion 33C whose bottom surface is a part that contacts with the fixing portion 33B, and which makes it easy to insert the first contact 33 into the holes (not shown in the figure) provided at the first contact holding portion 32A and the second contact holding portion 32B when the first contact 33 is fixed to the first contact holding portion 32A and the second contact holding portion 32B.

The contacting portion 33A is a portion that contacts with and slides on the conductive segments 23 of the first sliding portion 21. The contacting portion 33A is configured by a central portion α which is located at the top of the contacting portion 33A, a peripheral portion β which is provided around the central portion α, and an extensional portion γ which is further provided around the peripheral portion β.

The central portion α, unlike the arc-shaped cross-section of the conventional contact, has a flat surface in horizontal direction (the left and right direction in FIG. 4(A)), and the surface is round, as shown in FIG. 4(B). In addition, the central portion α, as shown in FIGS. 5(A) and 5(B), is restricted to a size which allows to contact simultaneously no more than two conductive segments 23 even when the conductive segments 23 are moved. Namely, when the central portion α contacts more conductive segments 23, the resistance value between the first contact 33 and the second contact 34 becomes larger, and the detection precision of the liquid level is effected. Thus, the effects on the detection precision of the liquid level is minimized by restricting the number of the conductive segments 23 that the first contact 33 or the second contact 34 contacts with at the same time to neighboring two.

In addition, a predetermined load is set and given based on the bending amount of the contact spring 32 as a pressing force when the first contact 33 or the second contact 34 contacts with the conductive segments 23. In the present invention, since the central portion α is configured by a flat surface, compared with the conventional point-contact ones, it is possible to stabilize and ensure a predetermined contacting area with the conductive segments 23. Thus, it is possible to press the first contact 33 or the second contact 34 against the conductive segments 23 at desired surface pressure.

In the first contact 33 of the embodiment, a surface, whose diameter [mm] satisfies the following formulae, is formed as the central portion α of the contacting portion 33A. That is, as shown in FIG. 6, in the embodiment, when the width W of a conductive segment 23 is 200 μm on average, and the interval D between conductive segments 23 is 200 μm, the diameter (φ), which is the contact width of the first contact 33, satisfies the following formula.

$$0.5 < \varphi \text{ [mm]} < 0.7 \quad (1)$$

Preferably, the diameter (φ) satisfies the following formula.

$$0.5 < \varphi \text{ [mm]} < 0.6 \quad (2)$$

The processes to obtain the formulae (1) and (2) are described later.

Each of the conductive segments 23, as shown in FIG. 7(A), has a generally arc-shaped cross-section before the initial sliding stage starts. As shown in FIG. 7(B), the central portion (top portion) of each of the conductive segments 23 is worn (the amount δ is worn) due to the sliding operation when in use, and a generally flat surface (below, flat surface 23A) is gradually formed. The flat surface 23A is expanded gradually (The width w of the flat surface 23A can be expanded to no more than the width W of one conductive segment). Thus, when the top portion of each of the conductive segments 23 forms the flat surface 23A and the central portions α of the first contact 33 and the second contact 34 have a shape that satisfies the above formulae (1) or (2), as described later, the wear of the first and second contacts 33 and 34 and the conductive segments 23 is lowered due to the contacting thereof, and a desired liquid level detecting precision is maintained.

Figure 4:
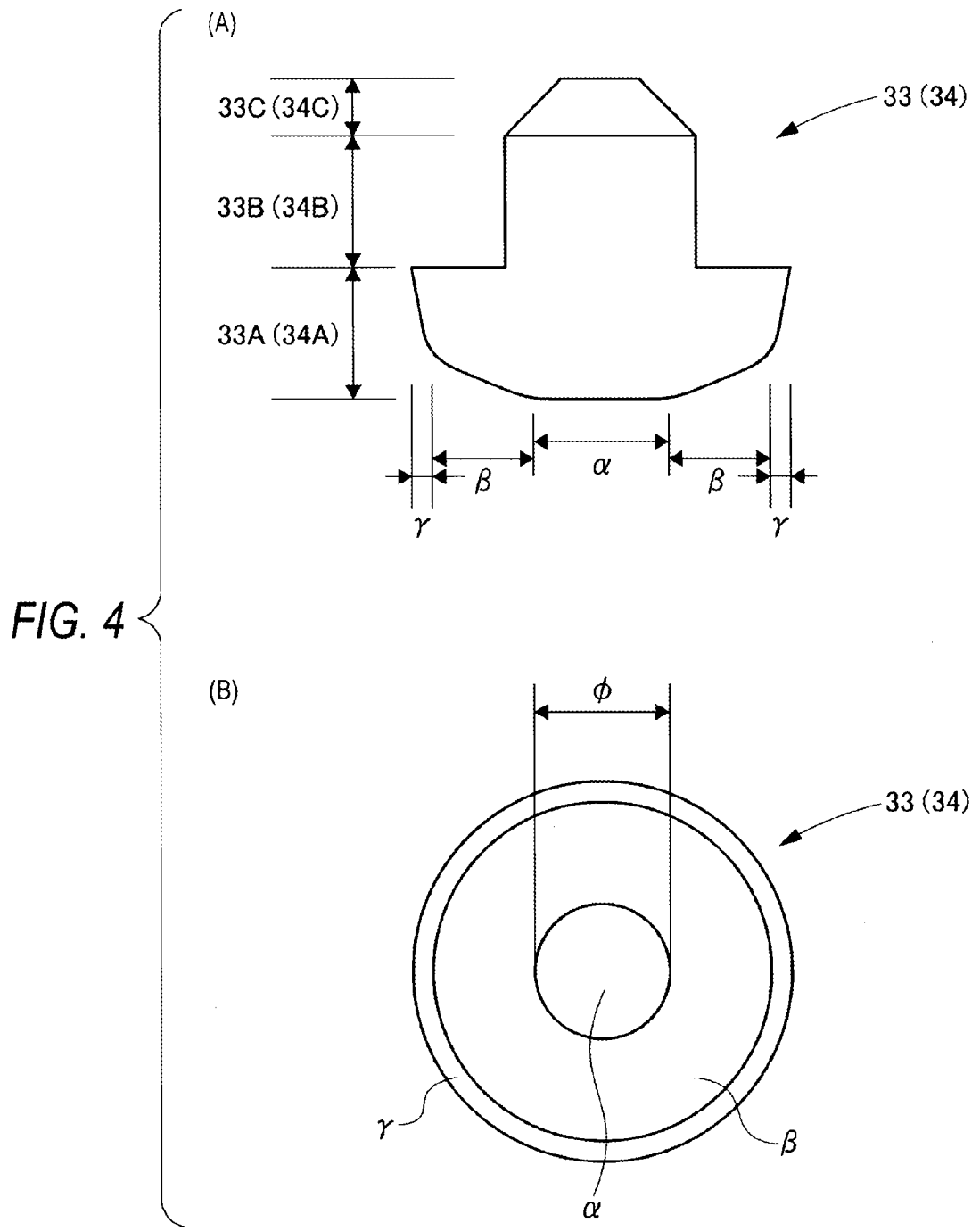
FIG. 4A is a side view showing a contact of the invention and FIG. 4B is a plan view of the contact.

As shown in FIG. 4, the peripheral portion β has a generally R-like arc-shaped in cross-section, in order to smoothly slide on each of the conductive segments 23 which are roughly pectinate conductive electrodes of the resistance plate 20.

In addition, the extensional portion γ is formed to have an inclined cross-section.

Furthermore, although the first contact 33 is described mainly, the second contact 34 also has a similar configuration, and performs similar operations on the conductive segments 23.

Next, the effects of the embodiment are described.

In the liquid level detecting apparatus of the embodiment, the contact spring 32 shown in FIG. 2 has electrical conductivity and resiliency, and the first contact 33 and the second contact 34 are pressed by a resilient force against the conductive segments 23 of the first sliding portion 21 and the second sliding portion 22, respectively. Because of this, the first contact 33 of the sliding body 30 shown in FIG. 1 contacts the conductive segments 23 of the first sliding portion 21 that opposes to the first contact 33 at a certain time, and the second contact 34 contacts the conductive segments of the second sliding portion 22 that opposes to the second contact 34 at a certain time. In this way, the first sliding portion 21 and the second sliding portion 22 are electrically connected to each other via the contact spring 32.

When the height of the liquid level changes, the float 41 moves upwards and downwards accordingly. Therefore, the contacting position of the sliding body 30 and the conductive segments 23 changes relatively. As a result, because the resistance value of the resistance plate 20 via the sliding body 30 and the conductive segments 23 changes, the height of the liquid level is detected on the basis of the fluctuation of the voltage output from the output terminals 25A and 25B at the time.

Particularly, according to the embodiment, because the central portions of the first contact 33 and the second contact 34 have a flat surface, the wear of the first contact 33 and the second contact 34 due to the contacting with the conductive segments 23 is lowered, in comparison with the point contacting of the conventional arc shape, by the stabilized pressure towards the conductive segments 23 and the surface contacting with the conductive segments 23, and predetermined liquid level detecting precision is maintained from the initial sliding stage.

For example, as shown in FIG. 8(A), in the initial sliding stage, even when a tiny insulating foreign object P is trapped between the first contact 33 (or the second contact 34) and the conductive segment 23, it is possible that the first contact 33 (or the second contact 34) are ensured to conductively contacts with the conductive segment 23 by slight inclination of the first contact 33 (or the second contact 34) attached to the contact spring 32A (or 32B) which possesses flexibility. On the one hand, since the distal end of the conventional contact is formed to have a generally R-like cross-section, although it is possible for the contact to incline by means of the contact spring, if a tiny insulating foreign object P is hold at the position of the point contact, the conduction of the contact and the conductive segment is cut off, and there is a possibility of having great influence on liquid level measurement.

Particularly, since the conventional contact has a R-shaped cross-section, in the contacting operation with the roughly pectinate conductive segments, the slip of the contact in the sliding direction was easy to occur due to the sliding operation of the contact with the R-shaped cross-section. As a result, the contacting point and the contact area were offset by the movement due to the slid of the contact from the original contacting positions, and positions changed. As a result, there was a possibility that a strongly non-linear relationship existed in the range of the flat surface of each of the conductive segments, and error may be generated in liquid level measurement. On the other hand, in the present embodiment, since the central portions α of the contacting portions of the first and second contacts 33, 34 have a flat shape, this kind of trouble can be avoided. In addition, according to the liquid level detecting apparatus of the embodiment, when a flat surface 23A as shown in FIG. 8(B) was formed on the conductive segments 23 with the lapse of use time, even when a similar tiny insulating foreign object P is trapped between the first contact 33 (or the second contact 34) and the conductive segment 23, it is possible that the first contact 33 (or the second contact 34) is ensured to conductively contact with the conductive segment 23 by extremely slight inclination of the first contact 33 (or the second contact 34).

Thus, according to the liquid level detecting apparatus of the embodiment, the change of a contact over time is stabilized by lowering intense wear of the contact in the initial sliding stage and imparting stabilized wear characteristics from the initial stage of sliding. Thus, it is possible to realize highly reliable liquid level detection all the time.

Next, with respect to the liquid level detecting apparatus including the first contact 33 and the second contact 34 of the invention, and the liquid level detecting apparatus provided with a conventional contact whose distal end contacts with and slides on conductive segments and which has a R-shaped cross-section, the relationship of the number (N) of the sliding times of the contact and the conductive segment and the wear amount of the contact (δ; See FIG. 7(B)) is illustrated.

As the result of testing the relationship of the number (N) of the sliding times of the contact and the conductive segment and the wear amount of the contact (δ), the function as shown in FIG. 9 was obtained. In FIG. 9, the horizontal axis is the sliding times, and the vertical axis is the wear amount of the contact (the wear amount from the top portion of the contact towards the contact spring). Further, the graph A is shown for the present invention, and the graph B is for the conventional one.

Therefore, it is appreciated that, compared with the conventional liquid level detecting apparatus whose contact has a generally arc-shaped cross-section, since the central portion of the first contact 33 and the second contact 34 of the liquid level detecting apparatus of the present invention has a flat surface, these contacts would not be sharply worn in the initial sliding stage (before 100,000 times of sliding). In other words, a linear graph is obtained as the correlation in the present invention. Because the wear over time is almost the same despite the sliding times, stabilized contacting and sliding operations can be obtained.

On the other hand, for the conventional liquid level detecting apparatus, it is appreciated that the contact is sharply worn in the initial sliding stage (before 100,000 times of sliding). Because of this, the contact and sliding operation become unstable, the detecting precision in the initial sliding stage is low, and it was verified that accurate liquid level detection is impossible.

Next, in order to specify optimum diameter of the first contact 33 or the second contact 34 of the liquid level detecting apparatus of the invention, experiments are made on the relationship of the diameter $\phi$ [mm] of the contact that contacts with the conductive segments 23, the contacting area [mm$^2$] of the contact in which the contact contacts with the conductive segments 23, and the surface pressure [N/mm$^2$] which is force per unit area applied to the contact that depends on the contact area, to find out their minimum values (MIN), maximum values (MAX), and mean values (AVE), respectively. Then, the results shown in FIG. 10 were obtained. Further, in order to find out the correlation of the diameter [mm] of the contact and the surface pressure [N/mm$^2$], the graph in FIG. 11, which shows their correlation clearly, was drawn up on the basis of the experimental data in FIG. 10.

Therefore, when the diameter $\phi$ of the contact is 0.3 to 0.5 [mm], it can be seen that the surface pressure decreases sharply from the relationship of the contacting area of the contact with the conductive segment and the surface pressure in FIGS. 10 and 11. On the one hand, when the diameter ($\phi$) of the contact exceeds 0.5 [mm], the surface pressure does not decrease significantly, but decreases gradually to near 0. Therefore, in order to decrease the wear of the contact, it is found that it is desirable to satisfy the following relationship.

$$0.5 < \phi \text{ [mm]} \tag{3}$$

However, when the value of $\phi$ is increased in order to decrease the surface pressure, it becomes possible that the contact contacts simultaneously with three or more neighboring conductive segments. In this case, the decrease of the detection precision occurs with the increase of the resistance value. In addition, it is verified that when the contact contacts simultaneously with no more than two neighboring conductive segments, detection precision is not a problem.

Figure 7:
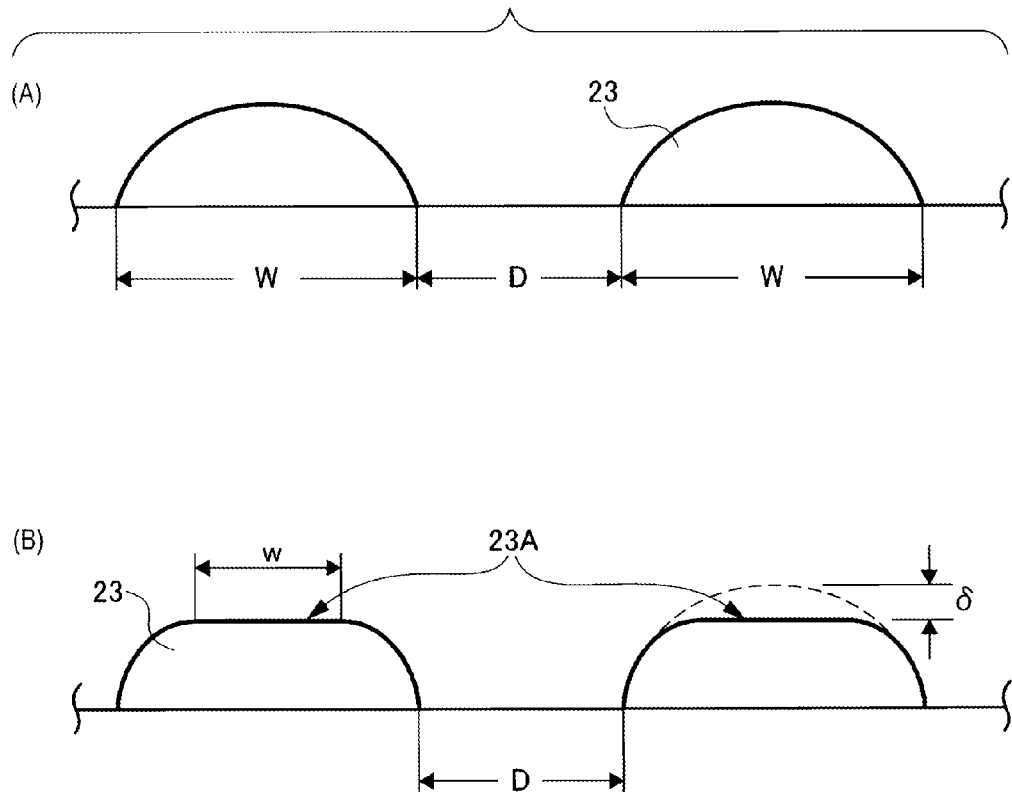
FIG. 7A is a side view for illustrating the shapes of the conductor segments which slidingly contact the contact before the sliding starts and FIG. 7B is a side view for illustrating the shapes of the conductor segments which slidingly contact the contact in the initial sliding stage.

Therefore, as shown in FIG. 7, when the width W of one conductive segment is 200 [μm], and the interval D of neighboring conductive segments is 200 [μm], it is found that it is desirable for the diameter $\phi$ of the contact to satisfy the next formula.

$$\phi \text{ [mm]} < D + W + D = 0.6 \tag{4}$$

Therefore, in the embodiment, it is appreciated from the aforementioned formulae (3) and (4) that it is desirable for the diameter $\phi$ of the contact to have a size that satisfies the following formula.

$$0.5 < \phi \text{ [mm]} < 0.6 \tag{2}$$

Furthermore, in each pattern of the conductor segments, as shown in FIG. 7(B), when a flat surface 23A is formed and the width w of the flat surface 23A reaches 200 [μm], to avoid that the above contact contacts simultaneously to three or more neighboring conductive segments, it is necessary for the diameter $\phi$ of the contact to be less than 0.6 [mm]. On the one hand, when the width w of the flat surface 23A is less than 200 [μm], it is also possible that the diameter $\phi$ of the contact is larger than 0.6 [mm]. Thus, when it is considered that a flat surface 23A has not been formed in the initial sliding stage, it is also allowable that the diameter $\phi$ of the contact satisfies the following formula.

$$0.5 < \phi \text{ [mm]} < 0.7 \tag{1}$$

The present invention is not limited to the above embodiment, and suitable modifications, improvements, can be made. Furthermore, the material, shape, dimensions, numerical values, form, number, disposition, etc., of each of the constituent elements of the above embodiment are arbitrary and are not limited so far as the invention can be achieved. For example, although the central portion α of the first and second contacts 33 and 34 shown in FIG. 4(B) has a flat surface that has a round shape, it is not particularly limited to the round shape, as long as the relationship of the contacting area [mm$^2$] and the surface pressure [N/mm$^2$] shown in FIGS. 10 and 11 is satisfied and the contact does not contact simultaneously with three or more neighboring conductive segments.

Although the present invention is described in detail with reference to the embodiments, it is apparent that various modifications and amendments may be made by those skilled in the art without departing from the spirit and scope of the invention.

This application is based on the Japanese patent application (patent application 2009-064364) filed on Mar. 17, 2009, the contents of which are incorporated herein by reference.

DESCRIPTION OF THE NUMBERS 1 liquid level detecting apparatus
10 frame
20 resistance plate
20A insulating substrate
20B conductive pattern
21 first sliding portion
22 second sliding portion
23 conductive segment
23A flat surface
24 resistor
25A, 25B output terminal
30 sliding body
31 arm holder
31A upper holding portion
31B lower holding portion
31C interconnecting portion
311 shaft hole
32 contact spring
32A first contact holding portion
32B second contact holding portion
32C proximal end portion
33 first contact
33A contacting portion 33B fixing portion
34 second contact
41 float
40 float arm
L fuel
P insulating foreign object
S liquid surface
α central portion (flat portion)
β peripheral portion
γ extensional portion
φ diameter (contacting width)

The invention claimed is:

1. A liquid level detecting apparatus, comprising
a resistance plate that has a plurality of conductive segments provided on an insulating substrate, and a resistor electrically connected with the plurality of conductive segments; and
a sliding body that includes a contact that contacts different ones of the plurality of conductive segments in response to the sliding body sliding in accordance with change of a level of a liquid surface,
wherein the plurality of conductive segments are provided on the insulating substrate at approximately equal intervals,
wherein the contact of the sliding body has a flat and round shaped top portion which contacts with the conductive segments and comes into surface contact with top portions of the plurality of conductive segments when the contact slides on the plurality of conductive segments,
wherein a diameter a of the flat and round shape top portion of the contact satisfies $0.5 < \alpha$ [mm] $< 0.6$, when the width W of the conductive segment is 200 [μm], and an interval D of neighboring conductive segments is 200 [μm],
wherein the flat and round shaped top portion of the contact of the sliding body includes:
a flat top, located at a top of the contacting portion, the flat top including a contacting surface that contacts the conductive segments and comes into surface contact with top portions of the plurality of conductive segments when the contact slides on the plurality of conductive segments; and
a multi-angled side surface extending from the contacting surface of the flat top to a surface of the sliding body, the multi-angled side surface including a peripheral portion and an extensional portion, the peripheral portion extending from the contacting surface of the flat top to the extensional portion at a first angle, the extensional portion extending from the peripheral portion to the surface of the sliding body at a second angle.

2. The liquid level detecting apparatus according to claim 1, wherein top portions of the conductive segments of the resistance plate which come into contact with the contact have a flat shape, and come into surface contact with a top portion of the contact when the contact slidingly contacts with the plurality of conductive segments.

3. The liquid level detecting apparatus according to claim 2, wherein in an initial sliding stage when the contact slides on the plurality of the conductive segments, the top portions of the conductive segments have the flat shape as a result of the conductive segments wearing down due to the sliding with the top portion of the contact.

4. The liquid level detecting apparatus according to claim 1, wherein the contact includes a base that contacts the surface of the sliding body, the base of the contact being wider than the flat top of the contact.

5. The liquid level detecting apparatus according to claim 1, wherein the contact includes a base that contacts the surface of the sliding body, and
wherein an angle formed by the extensional portion of the multi-angled side surface of the contact and the base of the contact is an acute angle.

6. The liquid level detecting apparatus according to claim 1, wherein the contact includes a base that contacts the surface of the sliding body, and
wherein, in a plan view, a perimeter of the base of the contact is different than a perimeter of the flat top of the contact.

7. The liquid level detecting apparatus according to claim 6, wherein, in the plan view, the perimeter of the base of the contact is concentric with the perimeter of the flat top of the contact.

* * * * *